July 26, 1949.  E. W. SEEGER  2,477,147
CONTROL FOR ELECTRIC MOTORS
Filed May 3, 1946
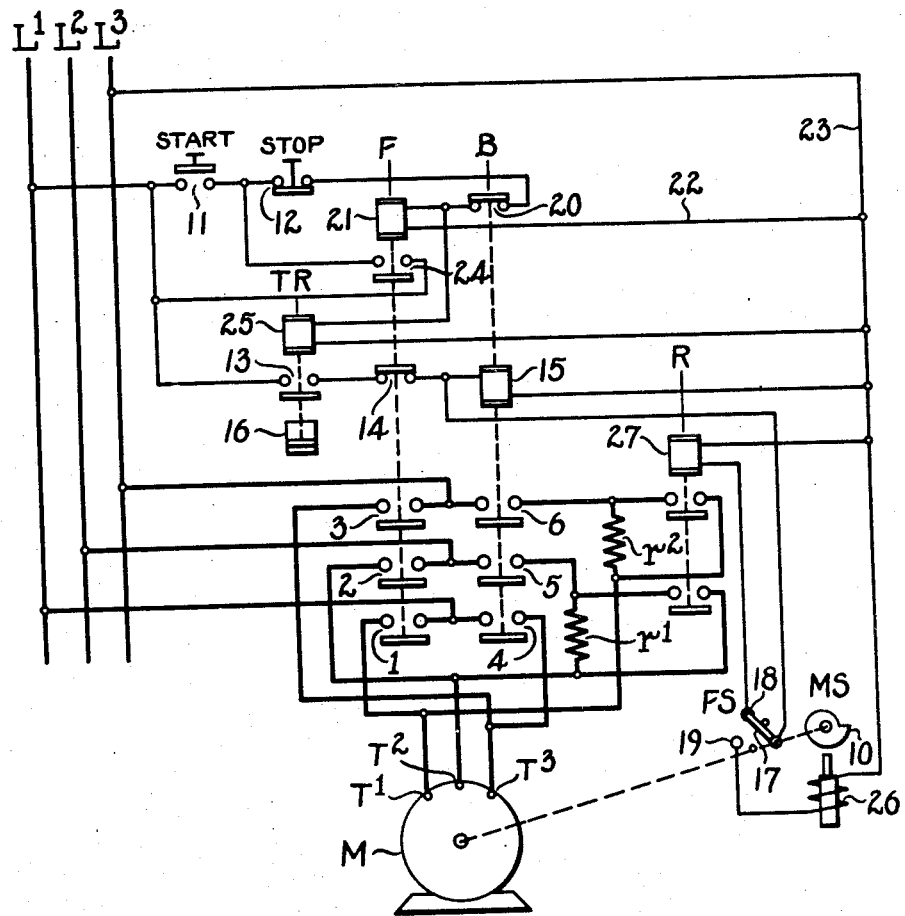
Inventor
Edwin W. Seeger
By Frank W. Hubbard
Attorney Patented July 26, 1949

2,477,147

UNITED STATES PATENT OFFICE 2,477,147

CONTROL FOR ELECTRIC MOTORS

Edwin W. Seeger, Wauwatosa, Wis., assignor to Cutler-Hammer, Inc., Milwaukee, Wis., a corporation of Delaware Application May 3, 1946, Serial No. 666,869

8 Claims. (Cl. 318—374)

This invention relates to improvements in control for electric motors and is especially advantageous in control of motor operated machine tool elements.

In control of machine tool elements quick and accurate stopping is highly desirable, and the present invention has among its objects to provide a controller of simple and reliable character affording for motors in the aforementioned and other service such quick and accurate stopping.

Another object is to provide means of the aforestated character utilizing plugging of the motor for rapid slowdown.

Various other objects and advantages of the invention will hereinafter appear.

According to the present invention it is proposed to slow down and reverse the motor by plugging, to restrict the motor to low torque in reverse operation, and finally to arrest the motor through the medium of a fixed mechanical stop.

The accompanying drawing illustrates diagrammatically one embodiment of the invention which will now be described, it being understood that the embodiment illustrated is susceptible of various modifications without departing from the scope of the appended claims.

Referring to the drawing, it shows a three phase alternating current driving motor M to be supplied from lines $L^1$, $L^2$ and $L^3$. A triple pole electromagnetic switch F is provided for connecting motor M to the supply lines for normal operation of said motor, while a triple pole electromagnetic switch B is provided to establish reversing connections between motor M and the supply lines for plugging. As will be apparent, the contacts 1, 2 and 3 of switch F connect motor terminals $T^1$, $T^2$ and $T^3$ to lines $L^1$, $L^2$ and $L^3$, respectively, while the contacts 4, 5 and 6 of switch B connect the motor terminals $T^3$, $T^2$ and $T^1$ to lines $L^1$, $L^2$ and $L^3$, respectively.

The aforedescribed reversing connections include resistors $r^1$ and $r^2$ in series with motor terminals $T^2$ and $T^1$, respectively, which resistors are short-circuited for plugging by a two-pole electromagnetic switch R.

The control means shown further comprise a single pole electroresponsive timing relay TR, a friction switch FS, and an electromagnetically controlled mechanical stop MS. As indicated by a broken line the friction switch FS and an element 10 of the mechanical stop MS are coupled to the motor, it being understood that the element 10 may be geared down as desired or that it may alternatively be coupled to the driven machine, or may comprise a moving part thereof. Further the control means illustrated include a start push button switch 11 having normally disengaged contacts and a stop push button 12 having normally engaged contacts.

The timing relay TR has normally disengaged contacts 13 in series with normally engaged contacts 14 of switch F in the circuit of the winding 15 of switch B. The relay TR when energized quickly engages its contacts 13 and when deenergized effects disengagement of said contacts subject to a time element. The relay TR may be provided with any preferred means to afford such time element, said relay for illustration being provided with a dash pot 16, which as will be understood may be readily designed to permit quick closure of contacts 13 and delayed disengagement thereof.

The friction switch FS is shown as of the double throw type, comprising an element 17 to be moved clockwise into engagement with a contact 18 by rotation of the motor under the control of switch F, and to be moved counterclockwise into engagement with a contact 19 upon reverse rotation of the motor under the control of plugging switch B.

Starting of the motor is effected by depression of push button switch 11 which completes circuit from line $L^1$ to and through stop push button switch 12, and normally engaged auxiliary contacts 20 of switch B, to and through the winding 21 of switch F, by conductors 22 and 23 to line $L^3$. This effects response of switch F to connect the motor directly to lines $L^1$, $L^2$ and $L^3$, as aforedescribed for normal operation. Moreover switch F in responding engages its normally disengaged contacts 24 to shunt the push button switch 11 thereby to establish for its winding 21 a maintaining circuit through the stop switch 12 and contacts 20 of switch B. The winding 25 of relay TR is connected between contacts 20 of switch B and line $L^3$ in parallel with the winding 21 of switch F, and hence relay TR is energized simultaneously with switch F and is maintained energized along with switch F.

Upon starting of the motor friction switch FS assumes the position shown, interrupting the circuit of the winding 26 of the mechanical stop MS to render it ineffective and tending to complete the circuit of the winding 27 of switch R. However, energization of winding 27 is dependent also upon closure of the contacts 13 of relay TR and contacts 14 of switch F, whereas the latter contacts are disengaged by response of switch F. Disengagement of contacts 14 likewise blocks energization of the winding 15 of switch B.

Stopping of the motor is effected by depression of push button switch 12 which opens the maintaining connections of switch F and relay TR. The relay TR because of its time element does not release immediately, whereas switch F does release immediately to engage its auxiliary contacts 14. Thereupon circuit is completed from line $L^1$ through the contacts 13 and 14 in series, to and through the winding 15 of switch B and the winding 27 of switch R, in parallel, to line $L^3$, the connection of the winding 27 including contacts 17 and 18 of the friction switch FS. Both switches B and R respond promptly and they establish reversing connections for motor M to lines $L^1$, $L^2$ and $L^3$ exclusive of the resistors $r^1$ and $r^2$. These connections through plugging action of the motor quickly stop and reverse the motor, whereupon the element 17 of the friction switch FS shifts to deenergize the winding 27 of switch R and release of switch R effects inclusion of the resistors $r^1$ and $r^2$ in the motor circuit for reduction of the motor torque while continuing to operate in reverse direction. Also such shifting of the element 17 of the friction switch FS effects its engagement with contact 19 to connect the winding 26 of the mechanical stop MS to line $L^1$ through the contacts 14 and 13, said winding having a direct connection to line $L^3$. The winding 26 being thus energized projects the mechanical stop into the path of element 10 to definitely limit the extent of reverse rotation of the motor. Then upon expiration of the time element of relay TR said relay disengages contacts 13 to deenergize switches B and R and also the winding of the mechanical stop MS, thus preparing the controller for restarting at will by again depressing the start push button switch 11.

As will be apparent, the controlled resistance of the motor circuit under reverse operating conditions can be selected to provide just enough motor torque to keep the driven device moving until it is mechanically stopped, slowdown and reversal of the motor being accomplished by direct connection of the motor to the line exclusive of such controlled resistance. Also as will be apparent, the control illustrated has the advantage of enabling the driven machine to be turned over by hand without completing circuit connections of any of the control windings.

While a separate timing relay is shown it is, of course, obvious that the timing switch might be mechanically combined with the switch F to be set upon response of switch F and to be released for delayed operation upon release of switch F, such combination of switches being well known. Likewise it will be obvious that the electromagnetically controlled stop MS might be replaced by a stop yielding upon rotation of the motor in normal operation but not upon reverse rotation of the motor, such mechanical device being well known but being less desirable.

While the reverse connections shown do not include any resistors during slowdown by plugging it is to be understood that if desired such connections may for such period include portions of resistors $r^1$ and $r^2$ or a separate set of resistors, and that if such separate set of resistors be permanently included in the reverse connections the values of resistors $r^1$ and $r^2$ are to be selected accordingly.

What I claim as new and desire to secure by Letters Patent is:

1. In combination, a motor, means to establish therefor selectively connections for running and reverse connections for plugging, and means controlled jointly by the former means and the direction of rotation of said motor to effect reduced torque operation of said motor when but only when the direction of rotation of said motor is reversed in plugging.

2. In combination, a motor, means to establish therefor selectively connections for running and reverse connections for plugging, means controlled jointly by the former means and the direction of rotation of said motor to effect reduced torque operation of said motor when but only when the direction of rotation of said motor is reversed in plugging, and a mechanical stop for said motor effective for limiting the extent of such reverse rotation of said motor.

3. In combination, a motor, means to establish therefor selectively connections for running and reverse connections for plugging, means controlled jointly by the former means and the direction of rotation of said motor to effect reduced torque operation of said motor when but only when the direction of rotation of said motor is reversed in plugging, and an electromagnetically controlled mechanical stop to limit rotation of said motor also controlled jointly by the first mentioned means and the direction of rotation of said motor to be set in stopping position when but only when the direction of rotation of said motor is reversed as the result of plugging.

4. In combination, a motor, means to establish therefor selectively connections for running and reverse connections for plugging, said means interrupting said reverse connections at the end of a temporary period normally sufficient for limited reverse rotation of said motor, means included in said reverse connections for reducing the torque of said motor, and means controlled jointly by the first mentioned means and the direction of rotation of said motor to exclude said torque reducing means from circuit upon initiation of plugging and to reinclude said torque reducing means when but only when the direction of rotation of said motor is reversed in plugging.

5. In combination, a motor, means to establish therefor selectively connections for running and reverse connections for plugging, said means interrupting said reverse connections at the end of a temporary period normally sufficient for limited reverse rotation of said motor, a mechanical stop limiting reverse rotation of said motor, means included in said reverse connections for reducing the torque of said motor, and means controlled jointly by the first mentioned means and the direction of rotation of said motor to exclude said torque reducing means from circuit upon initiation of plugging and to reinclude said torque reducing means when but only when the direction of rotation of said motor is reversed in plugging.

6. In combination, a motor, a switch for establishing running connections therefor, an electroresponsive switch for establishing reverse connections for said motor for plugging, a normally open time element switch which is coordinated with the first mentioned switch to close upon establishment of running connections and to open subject to its time element upon interruption of running connections, and which in conjunction with contacts of the first mentioned switch effects for a temporary period energization of said plugging switch upon and only upon interruption of running connections, a mechanical stop limiting the reverse operation of said motor resulting from plugging, torque reducing means for said reverse connections of said motor, and means excluding said torque reducing means from circuit for plugging and including the same in circuit upon reverse rotation of said motor resulting from plugging.

7. In combination, a motor, a switch for establishing running connections therefor, an electroresponsive switch for establishing reverse connections for said motor for plugging, a normally open switch having a substantial time element in opening when tripped in closed position, said time element switch being coordinated with the first mentioned switch to close upon establishment of running connections and to trip upon interruption of running connections, and said time element switch in conjunction with contacts of the first mentioned switch effecting energization of said plugging switch upon interruption of running connections, a friction switch responsive to reversals in rotation of said motor, voltage reducing means for said reverse motor connections, and means under the control of said friction switch and said time element switch to exclude said voltage reducing means from said reverse connections for slowdown of said motor, and to include said voltage reducing means in circuit upon reversal of rotation of said motor resulting from said reverse connections.

8. In combination, a motor, a switch for establishing running connections therefor, an electroresponsive switch for establishing reverse connections for said motor for plugging, a normally open switch having a substantial time element in opening when tripped in closed position, said time element switch being coordinated with the first mentioned switch to close upon establishment of running connections and to trip upon interruption of running connections, and said time element switch in conjunction with contacts of the first mentioned switch effecting energization of said plugging switch upon interruption of running connections, a friction switch responsive to reversals in rotation of said motor, voltage reducing means for said reverse motor connections, and plural electroresponsive means under the control of said friction switch and said time element switch, one of said plural electroresponsive means comprising a mechanical stop to limit the range of reverse rotation of said motor resulting from said reverse connections, and another of said plural electroresponsive means excluding said voltage reducing means from said reverse connections for slowdown of said motor and for including said voltage reducing means in circuit upon reversal of the rotation of said motor resulting from said reverse connections.

EDWIN W. SEEGER.

REFERENCES CITED

The following references are of record in the file of this patent:

UNITED STATES PATENTS

| Number | Name | Date |
|---|---|---|
| 1,861,245 | Smith | May 31, 1932 |
| 2,005,663 | Phily | June 18, 1935 |
| 2,155,631 | Price | Apr. 25, 1939 |